United States Patent
Flinta et al.

(10) Patent No.: US 8,570,897 B2
(45) Date of Patent: Oct. 29, 2013

(54) INTER-DOMAIN MAP-FINDER

(75) Inventors: Christofer Flinta, Stockholm (SE); Jan-Erik Mångs, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1237 days.

(21) Appl. No.: 12/097,749

(22) PCT Filed: Dec. 16, 2005

(86) PCT No.: PCT/SE2005/001953
§ 371 (c)(1),
(2), (4) Date: Jun. 16, 2008

(87) PCT Pub. No.: WO2007/069960
PCT Pub. Date: Jun. 21, 2007

(65) Prior Publication Data
US 2008/0291845 A1    Nov. 27, 2008

(51) Int. Cl.
*H04L 12/28* (2006.01)
(52) U.S. Cl.
USPC .................................................. 370/254
(58) Field of Classification Search
None
See application file for complete search history.

(56) References Cited

U.S. PATENT DOCUMENTS

| | | | |
|---|---|---|---|
| 7,164,679 B2 * | 1/2007 | Kotha et al. | 370/392 |
| 2004/0039839 A1 * | 2/2004 | Kalyanaraman et al. | 709/238 |
| 2006/0262735 A1 * | 11/2006 | Guichard et al. | 370/254 |

OTHER PUBLICATIONS

Lei Wang, Hanyi Zhang, Xiaoping Zheng: Inter-domain routing based on simulated annealing algorithm in optical mesh networks.
Ebata M Takihiro S Miyake M Koizumi Hitachi T et al: Inter-Domain QoS Provisioning and Accounting: draft-ebata-inter-domain-qos-acct-00.txt.
Marc Blanchet Florent Parent Viagenie Bill St-Arnaud Canarie: Optical BGP (OBGP): InterAS lightpath provisioning; draft-parent-obgp-01.txt.
Coltun Siara Systems D Ferguson Juniper Networks J Moy Sycamore Networks R: "OSPF for Ipv6; rfc2740.txt".

* cited by examiner

*Primary Examiner* — Chirag Shah
*Assistant Examiner* — Jenkey Van (57) ABSTRACT

Link information is obtained about new or changes links in a communications system having a plurality of domains. The link information concerning a link between a first and a second domain comprises at least four pieces of information, domain identity of the first domain, domain identity of the second domain, link end identifier for a first end of the link, and link end identifier for a second end of the link. The link information is cascaded through the communications system by providing the link information stepwise from one domain to an adjacent domain. This is achieved by spreading the obtained link information to adjacent domains and by distributing link information received from adjacent domains to further adjacent domains. Preferably, the link information is compiled and access to the compiled link information is provided for creation of a system link map.

21 Claims, 8 Drawing Sheets

Fig. 6

INTER-DOMAIN MAP-FINDER

TECHNICAL FIELD

The present invention relates in general to multi-domain communications systems and in particular to provision of topological map information of multi-domain communications systems.

BACKGROUND

Many communication systems of different types and sizes are available today. A tendency is that the number of network nodes grows fast, which results in large complex network structures and topology. This is caused, partly because of the increasing traffic and partly on that the networks are requested to cover larger and larger geographical areas. Communication networks having nodes at all continents are present today. However, the more nodes and the more traffic that is to be transmitted, the more complex the configuration of the networks becomes.

A Virtual Private Network (VPN) utilises a public or private communications network to conduct private communications. Traditionally, a company or other customer that wanted to build a wide-area network had to provide for its own dedicated lines between each node to provide the connectivity. Such solutions are, however, generally expensive and inflexible. Conventionally, a VPN is created according to an agreement between a network operator and a customer. When having more and more complex communications networks, e.g. multi-domain networks, configuration becomes more and more complex and time consuming.

The general trend in communication network development goes to more and more flexible solutions. Mobile and wireless communication technologies are used, not only between different end terminals and a network, but also between different network parties. In such solutions, the different parties have responsibility for a respective communication system domain. The flexibility in connecting and disconnecting entire part networks, such as entire domains, makes situations, where a network continuously changes its appearance, more and more common. The task of communication configuring in such a dynamic network, e.g. the configuring of VPNs becomes extremely difficult since the available connection conditions between domains are continuously changing. In order to find optimum or at least well-operating solutions, the different domain operators always have to be updated about any changes in entire network topology.

One solution of the problem is to introduce a main controller node for the entire multi-domain communications system that is always updated, i.e. a hierarchical top structure. However, if the different domains are operated by different operators, not legally associated to each other, it may not be obvious that all information from one domain should be unconditionally available for such a main controller node. It might also be organizationally difficult for certain operators to be dependent on a main controller operator also for managing of their own domains. In most operator cooperation agreements, the operators are typically equal partners, where their relations are governed by mutual agreements. Furthermore, if the main controller node breaks down, the entire access to system-wide connection information vanishes.

SUMMARY

A general problem with prior-art communication systems is that there is no efficient, robust and organizationally acceptable solution for provision of topological map information in multi-domain communications systems.

A general object of the present invention is thus to provide methods and arrangements providing topological map information in multi-domain communications systems in a robust manner.

The above object is achieved by methods and arrangements according to the enclosed patent claims. In general words, link information is obtained about new or changed links. The link information concerning a link between a first and a second domain comprises at least four pieces of information, domain identity of the first domain, domain identity of the second domain, link end identifier for a first end of the link, and link end identifier for a second end of the link. The link information is cascaded through a communications system having a plurality of domains by providing the link information stepwise from one domain to an adjacent domain. This is achieved by spreading the obtained link information to adjacent domains and by distributing link information received from adjacent domains to further adjacent domains. Preferably, the link information is compiled and access to the compiled link information is provided for creation of a system link map.

An advantage with the present invention is that it provides means for making topological map information available throughout a multi-domain communications system without relying on an error-free operation of a single node. Furthermore, the provision of topological map information is performed in a manner which in most cases will be acceptable by different cooperating operators, together forming the multi-domain communications system. Another advantage is that no domain internal links necessarily have to be shown or are needed for the basic version of the protocol.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present disclosure, the term "domain" is used in a relatively wide meaning. A domain as defined in the present disclosure is a group of communication means communicating with the surroundings or other domains mainly via one or several border nodes. This group of communication means may be an administrative group, e.g. belonging to a certain operator or an autonomous system. A domain may also be any kind of sub-group of a communications network or just a number of selected nodes in a communications network. In the term "domain" are also included different kinds of smaller networks, such as home communication networks, PAN, WLAN hotspots or enterprise site networks. It also includes dynamically changing topologies and moving networks, such as networks at busses, trains or boats with wireless connections to other networks.

Figure 1:
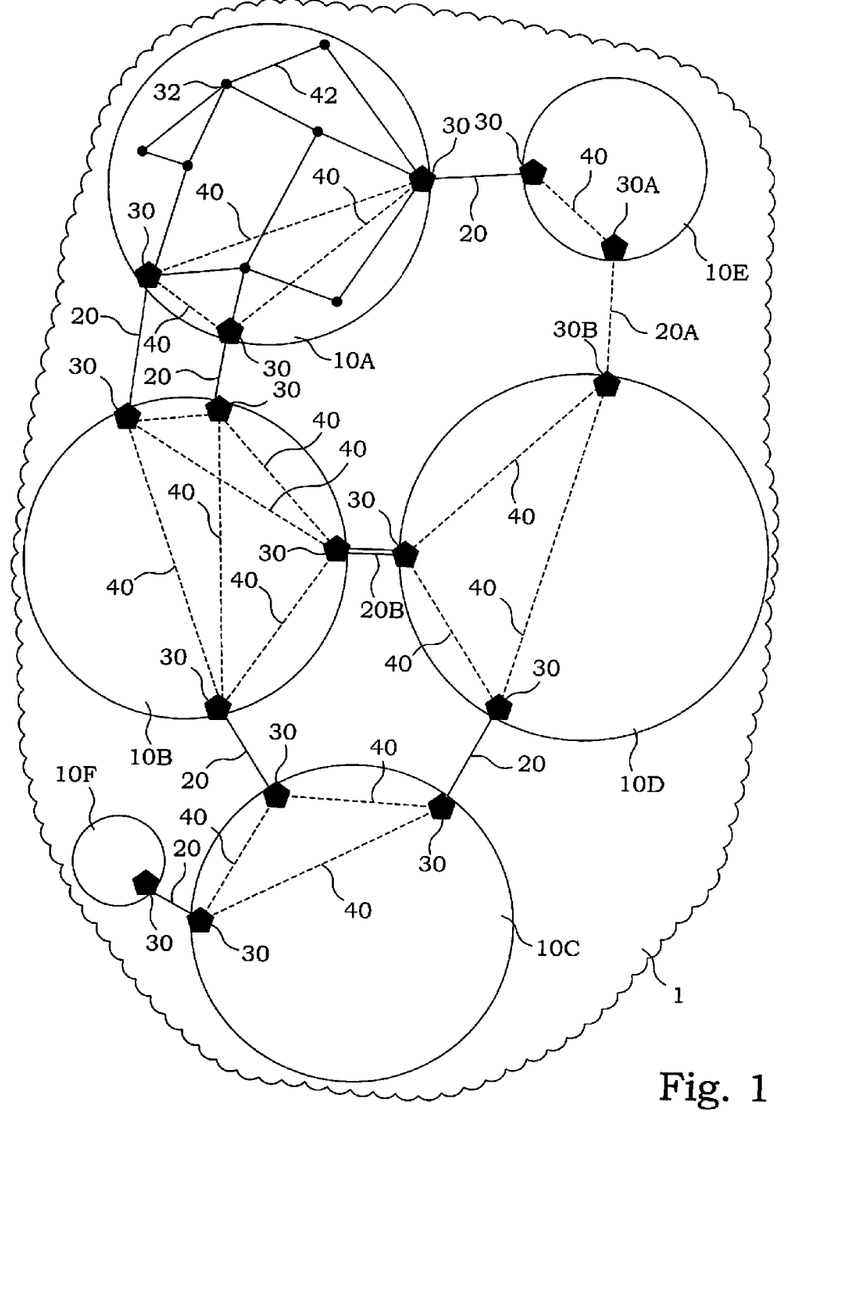
FIG. 1 is a block diagram schematically illustrating a multi-domain communications system.

FIG. 1 illustrates an embodiment of a multi-domain communications system 1. The multi-domain communications system 1 comprises a number of domains 10A-F, connected by inter-domain links 20, 20A-B. The inter-domain links 20, 20A-B typically start and stop at ports 30, 30A-B at borders nodes of the domains 10A-F, i.e. the link ends are connected to nodes in the domains. The ports within a domain are connected by intra-domain links 40. These intra-domain links 40 can be real links, but may also be logical links, based on an intra-domain link network structure. Such a structure is illustrated schematically for domain 10A, where internal nodes 32 are connected by links 42. For the operation of the present invention, the actual internal structure of the intra-domain links 40 is not of importance, and is thus not further discussed. The only relevant feature is that there exists at least one connection path between the different ports of a domain.

In order to be able to create a complete system link map, certain topological map information has to be available. The identities of the domains participating in the multi-domain communications system have to be known. The identity used could e.g. be an autonomous system number. Furthermore, identities of the links connecting the domains have to be known and associated with the respective domain identities. In other words, all inter-domain links have to be known and for each such link, information about which domains it connects to has to be associated. Furthermore, since there generally are possibilities to connect domains by more than one link, the links should also be associated with identities of the ports, node or address at which it ends, i.e. a link end identity should be defined.

The link ends 30, 30A-B are typically provided at border nodes of the domains. A link end identifier may then be constituted by an identity of the border node to which the link end is connected. However, there are other and/or complementary alternatives for identify the link ends. A link end may e.g. be identified by an IP address or a domain specific address. Such address identities may also be combined with a border node identity, in order to further specify the link end.

If the link ends are specified by e.g. only the border node identity, more than one link may utilize the same link end identity. If the different addresses are used as end points of different links, more than one link can be associated to one port. In FIG. 1, the link 20B comprises two part links, utilizing two different addresses at the border nodes of the different domains. If the border node identity is used as the only link end identifier, the link 20B is considered as one partitioned link. However, if the addresses are used to specify the actual physical ports, maybe also together with the border node identity, the reference number 20B refers to two separate links. The granularity of the link end identities can be selected by each domain or by a common agreement.

Figure 2A:
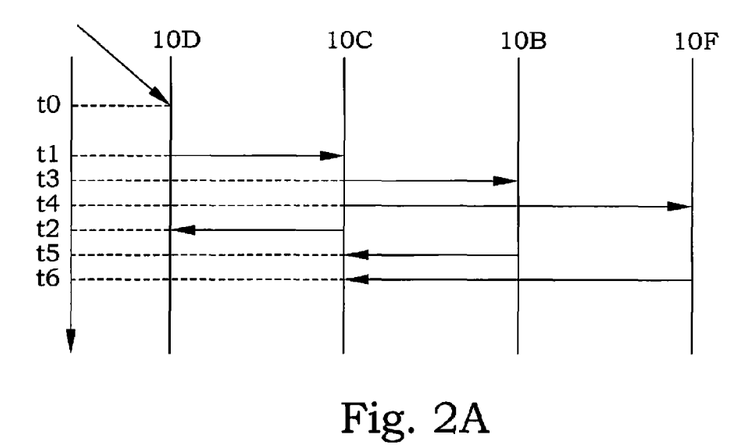
FIGS. 2A-B are time diagrams illustrating timing of information flow according to embodiments of the present invention.

According to the present invention, the topological map information necessary for creating a system link map is cascaded through the multi-domain communications system from one domain to the next. An example will be used to illustrate such information cascading. In FIG. 2A, an example of time diagram for information provision within the communications system of FIG. 1 is illustrated. The start assumption is that all domains are present in the system, but that the inter-domain link 20A is not previously available. The inter-domain link 20A is set-up between border nodes 30A and 30B. Information about this link thus becomes available in the domains 10D and 10E. At time t0, the information about link 20A is obtained in domain 10D. At time t1, the link information about link 20A is provided to an adjacent domain 10C. The adjacent domain 10C replies by an acknowledgement at time t2. Domain 10C compiles the received information to be useful for map creation in domain 10C, and forwards at time t3 and t4, respectively, link information to a further adjacent domains, in this case domain 10B and domain 10F. The domains 10B and 10F replies at times t5 and t6, respectively, by sending an acknowledgement to domain 10C. This procedure continues until the link information is spread over the entire communications system.

The necessary feature to achieve a distribution of link information over the entire system is that every domain presents two basic properties. Preferably, a third property is also present. The first property is an identifying and spreading functionality, which means that all domains should have functionality to obtain link information about new or adjusted links and functionality to transmit such link information to adjacent domains. The second functionality is a forwarding functionality, which means that all domains should have functionality to receive link information from adjacent domains and functionality to distribute the received link information to further adjacent domains. The third functionality is a collection and provision functionality, which means that all domains should have functionality to compile link information that is received from adjacent domains or obtained within the own domain and functionality to provide access to the compiled link information for creation of a system link map.

In one embodiment of the present invention, the spreading and distribution of link information is basically performed to all adjacent domains, however, typically with some kind of loop-stop functionality. The necessity of such arrangements can be illustrated by FIG. 2B. The start assumptions are the same as in the previous example. At time t0, the information about the new link 20A is obtained in domains 10D and 10E. At time t7, domain 10E provides link information about link 20A to its adjacent domain 10A. It is here unnecessary to provide the new link information to domain 10D since it is obvious that domain 10D will have access to that information anyway. Domain 10A sends an acknowledgement at time t8. Also domain 10D provides the link information to adjacent domains. At time t9, domain 10B is provided and at time t1 (as above) domain 10C is provided with the link information. The reception of link information is preferably acknowledged at times t10 and t2, respectively.

Figure 2B:
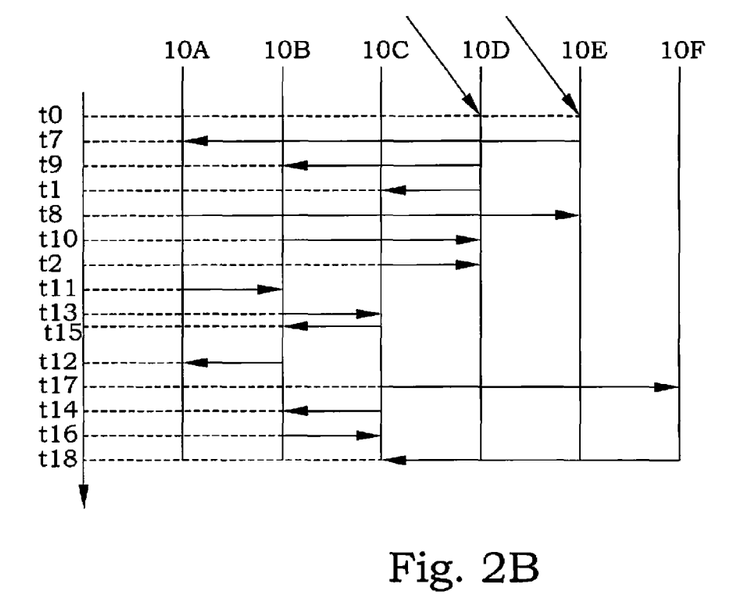

The next step in the link information cascading is then started. At time t11, domain 10A distributes the link information to domain 10B. It does not distribute it back to domain 10E, since it is obvious that domain 10E already has the information. Alternatively, the link information is indeed distributed back to domain 10E, and may then be used as an acknowledge message (c.f. the acknowledgement at time t8). At time t12, domain 10B sends an acknowledgement. Domain 10B has also received the link information, from domain 10D and prepares therefore for distributing the link information further. If there is enough time between t11, i.e. the reception of link information from domain 10A, and the time where the further distribution is going to be performed, domain 10B may realize that the same link information is received from both domain 10A and 10B. It is thus not necessary to distribute the link information from domain 10B to domain 10A. Therefore at time t13, the link information is only provided to domain 10C. Domain 10C returns an acknowledgement at time t14. Domain 10C has also received the link information, also from domain 10D and prepares therefore for distributing the link information further. Assume in this case that there is not enough time between t13, i.e. the reception of link information from domain 10B, and the time where the further distribution is going to be performed, for domain 10B to recognize the link information identity. Therefore at time t15 and t16, respectively, the link information is provided to domain 10F and domain 10B, respectively. Domains 10F and 10B return acknowledgements at times t17 and t18, respectively.

At this stage, domain 10F has no further adjacent domain to communicate with, and domain 10B can easily realize that the link information received from domain 10C just is a duplicate of earlier received link information. The link information is available in all domains, and the cascading therefore ends.

In the above example, evaluation of the identity of the link information is used to remove unnecessary signaling between the domains, and thereby to prohibit the link information to be sent in loops. Such loop stop control may be further simplified if the link information is provided with an associated message identity label, which makes it possible for each domain to determine if the link information has been received already. Other loop stop functionalities can also be applied. For instance, the link information can be associated with a time of creation. The forwarding of link information can then be allowed to continue unlimited during a certain life time of the link information. Too old link information will then just be ignored, whereby any loops will be stopped automatically. Another alternative that can be used in communications systems where there is knowledge about the maximum number of inter-domain links necessary to use between the two most remote domains is to associate the link information with a hop number, which will be reduced successively for each forwarding step. When the hop number reaches zero, no further forwarding is performed.

When the compiling of the link information is performed, any kind of time labels of the link information can be of use. If the time label states the creation time of the link or the link information message, the compiling node may easily decide if the available link information is a true update or just a delayed old version. Moreover, when a map is created, the map may be associated with a time label that states the time of the oldest link information that was used to create the map. A "freshness" stamp can thereby be provided together with the actual map.

Figure 2C:
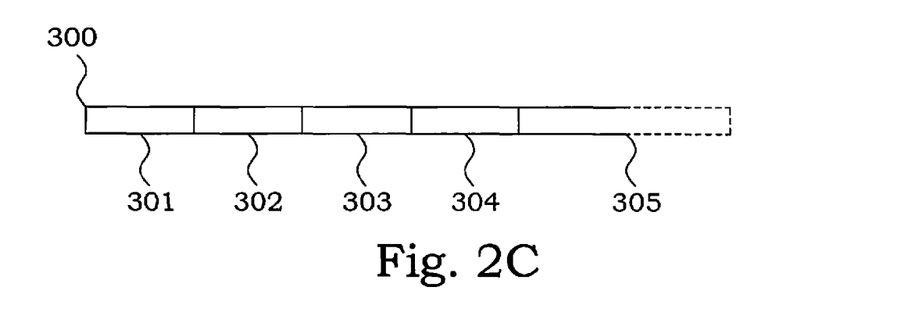
FIG. 2C is a schematic illustration of an embodiment of an information entity according to the present invention.

The link information for a link between a first and a second domain spread over the communications system comprises at least four entities: domain identity of the first domain, domain identity of the second domain, a link end identifier for a first end of the link connected to the first domain and a link end identifier for a second end of the link connected to the first domain. Such a link information package 300 is schematically illustrated in FIG. 2C. 301 denotes the domain identity of the first domain, 302 denotes the domain identity of the second domain, 303 denotes the link end identifier for the first end, and 304 denotes the link end identifier for the second end. Any further associated information, such as time labels, message identity labels, etc. are indicated by 305. It should be noted that even if the link information package 300 is illustrated as one single package, the link information may not necessarily be transmitted in one package. In reality it can also be distributed in pieces, which subsequently are re-associated to each other upon reception.

If a domain operator so allows, also intra-domain links can be included in the link information distribution discussed above. In such a case, both specified domain identities are the same. Still the link end identities are defined, to enable a mapping of the intra-domain links. These intra-domain links could still be logical links, but may also be physical ones. The link end identities may then be associated not only by border nodes, but rather by any node within the domain that the link uses, i.e. also internal nodes of the domain.

Additional or optional information about the links may also be of use for a map creator. Such information could e.g. be transit policy for the links, total available bandwidth, transmission direction, link characteristics, wireless/wireline character etc.

One specific type of additional information could be useful to handle the removal of a link. By having e.g. a flag indicating if the information concerns a new or changed link or if the information concerns the removal of an earlier existing link, also removal of links can be handled easily.

Figure 3A:
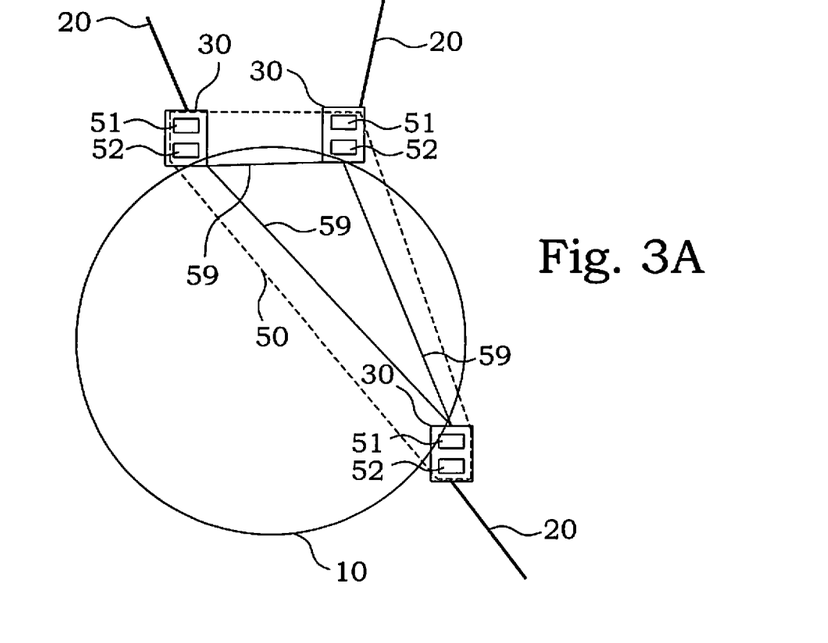
FIGS. 3A-D are block diagrams schematically illustrating embodiments of domains comprising arrangements according to the present invention.

Arrangements according to the present inventions are available in each domain. However, the actual implementation may differ. FIG. 3A illustrates a block scheme of main parts of a domain comprising an embodiment of an arrangement 50 for providing topological map information according to the present invention. In this example, a domain 10 has three inter-domain connections 20 ending at three border nodes 30. In this embodiment, all border nodes have similar equipment, comprising an evaluation and communication section 51 and a topological map information storage 52. The border nodes are interconnected by control links 59. The arrangement 50 for providing topological map information of the present embodiment is thus arranged as a distributed means having local processor and storage capacity. The border nodes thus provide a multitude of identical information sources, which provides a redundancy in case of node failures.

Figure 3B:
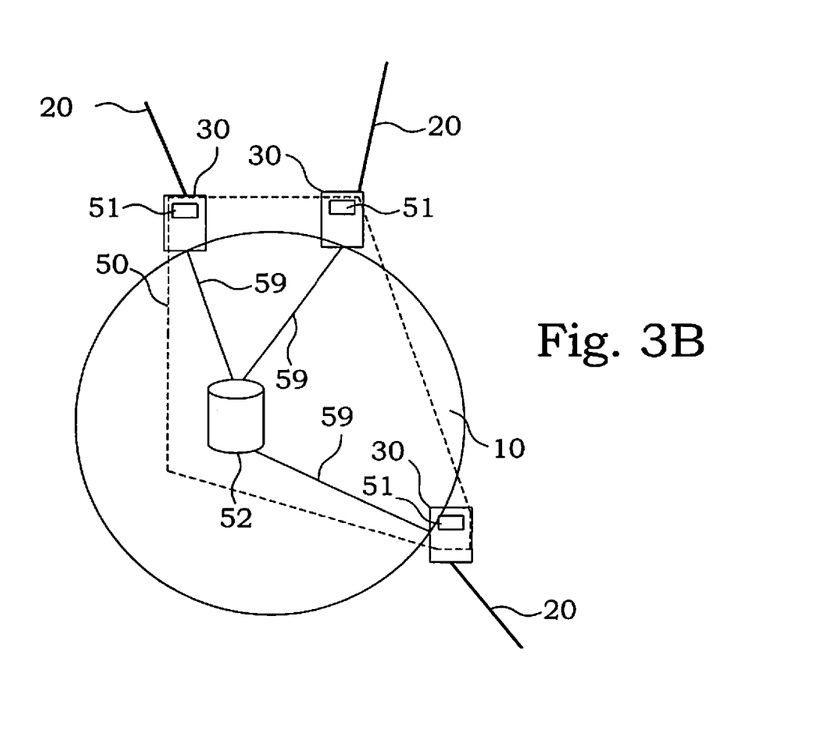

In FIG. 3B, a block scheme of main parts of a domain comprising another embodiment of an arrangement 50 for providing topological map information according to the present invention is presented. In this embodiment, each border node still has its own evaluation and communication section 51, whereas a common central database 52 is provided for the entire domain.

Figure 3C:
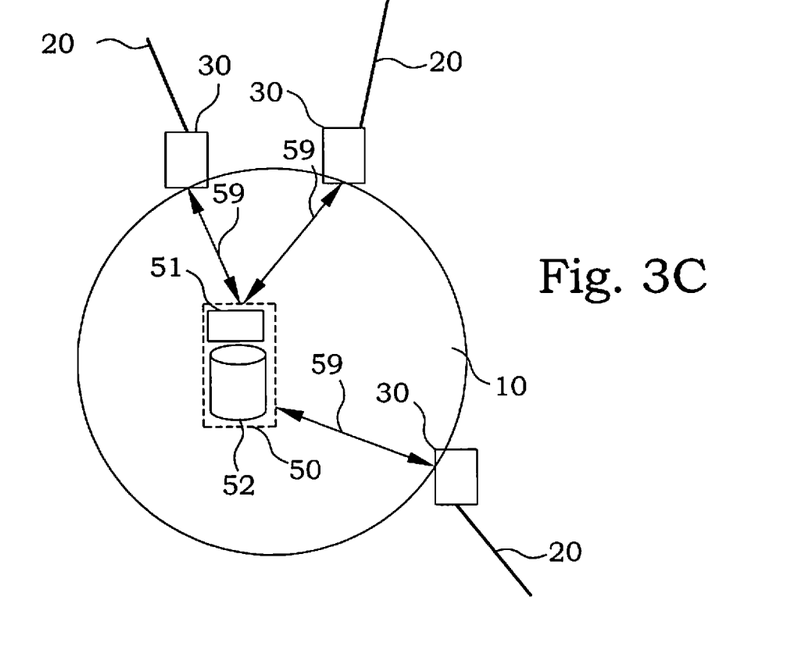

In FIG. 3C, a block scheme of main parts of a domain comprising yet another embodiment of an arrangement 50 for providing topological map information according to the present invention is presented. In this embodiment, the arrangement 50 for providing topological map information is essentially comprised in a centralized node having a common evaluation and communication section 51 and a common central database 52. The arrangement 50 for providing topological map information communicates with the border nodes 30 via control links 59. The actual communication with adjacent domains is in this embodiment performed via the border nodes 30, which then serve more or less as pure forwarding nodes.

Figure 3D:
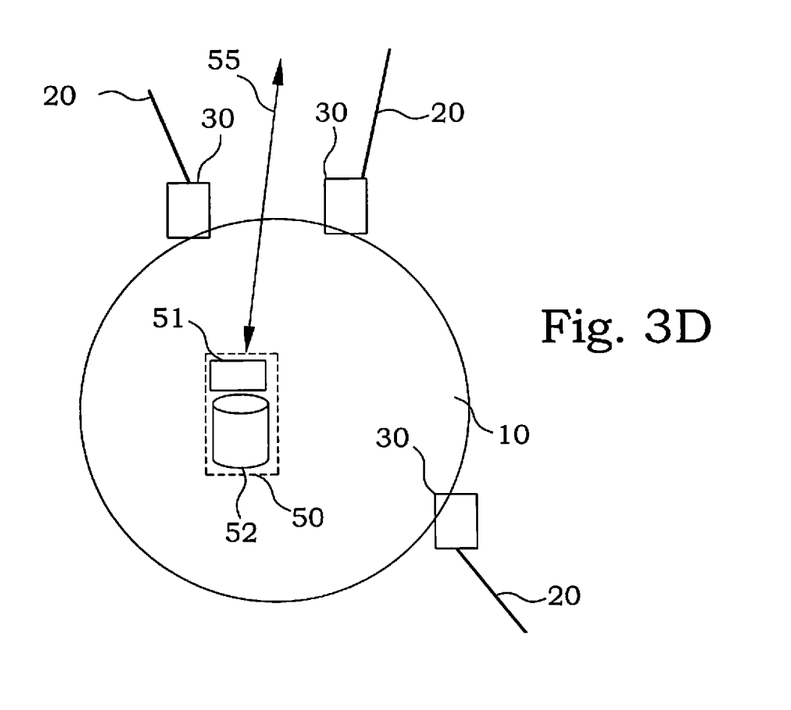

In FIG. 3D, a block scheme of main parts of a domain comprising a centralized embodiment of an arrangement 50 for providing topological map information according to the present invention is presented. In this embodiment, also communication 55 with adjacent domains takes place directly to/from the central arrangement 50.

As seen from the examples presented in FIGS. 3A-D, there are many different possibilities for implementing the arrangement 50 for providing topological map information. The details in implementation is, however, only the concern for the own domain, which means that different domains can solve the implementation in different ways.

Figure 4A:
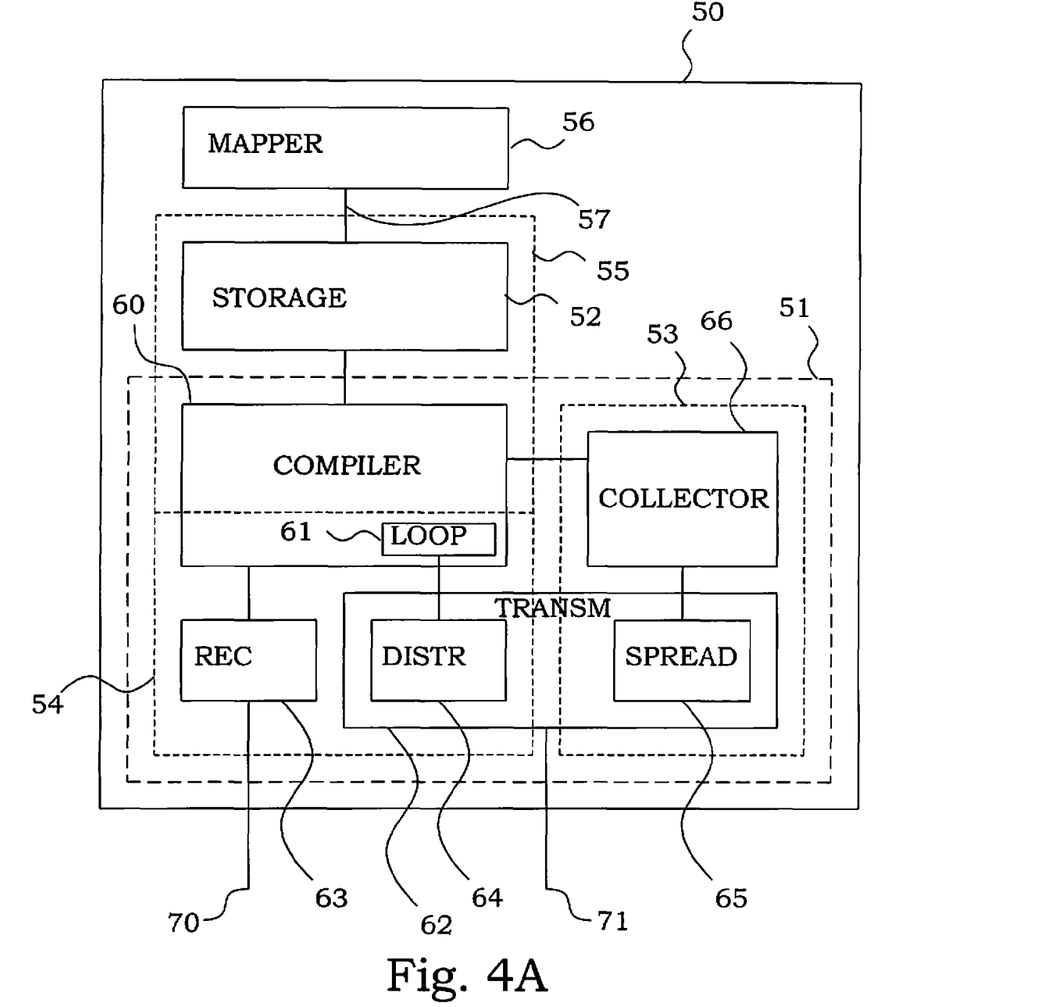
FIGS. 4A-B are block diagrams schematically illustrating main components of embodiments of arrangements according to the present invention.

Also the internal implementation of the arrangement for providing topological map information may differ between different embodiments. FIG. 4A illustrates a block scheme of an embodiment of an arrangement 50 for providing topological map information according to the present invention. This arrangement 50 can in analogy with previous description be implemented in a central, distributed or partly distributed manner. An evaluation and communication section 51 comprises means 53 for identifying links and spreading link information. The means 53 for identifying links and spreading link information in turn comprises means for obtaining information about a first link, a first end of which being connected to the domain in which the arrangement 50 is located. In the present embodiment the means for obtaining information about a first link comprises means for collecting 66 the information about the first link, i.e. the actual means gathering necessary information. The arrangement 50 further comprises a transmitter 62, arranged for providing means 65 for spreading link information about the first link to an adjacent domain over a transmission connection 71. The means 53 for identifying links and spreading link information is considered to comprise the means 65.

The arrangement 50 further comprises forwarding means 54, arranged to receive link information from adjacent domains and to distribute the received link information to further adjacent domains when appropriate. The forwarding means 54 comprises a receiver 63, arranged for receiving link information about a new or changed link from an adjacent domain over a receiver connection 70. The link information is in the present embodiment supplied to a compiler 60, in turn comprising a loop stop section 61. The compiler 60 is arranged to decided if and to what extent the link information has to be distributed to further adjacent domains. If such a distribution is to be performed, a distributor section 64 of the transmitter 62 is arranged for distributing the link information to the adjacent domains decided on.

The arrangement 50 of the present embodiment further comprises collection and provision means 55, arranged to compile link information that is received from adjacent domains or obtained within the own domain and functionality to provide access to the compiled link information for creation of a system link map. To this end, the collection and provision means 55 comprises the compiler 60, a topological map information storage 52 and a map creator connection 57. The compiler 60 is as described earlier arranged to receive link information received from adjacent domains, and is furthermore provided with link information obtained within the own domain from the means for collecting 66. The information is typically processed and stored in the topological map information storage 52. The topological map information storage 52 is arranged to be available for creation of a system link map by the connection 57. In the present embodiment, the connection 57 is connected to a means 56 for creating a system link map based on the compiled and stored link information.

Figure 4B:
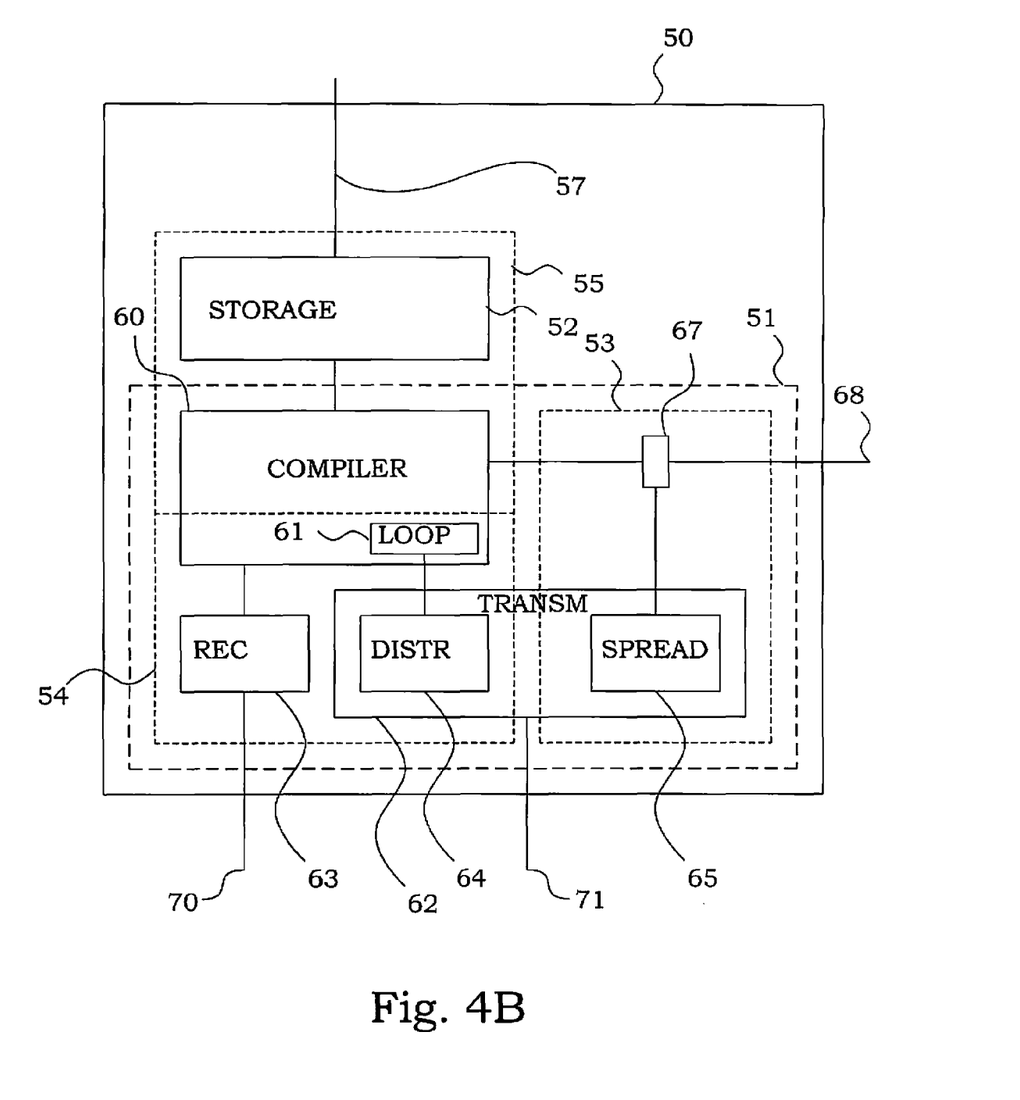

FIG. 4B illustrates a block scheme of another embodiment of an arrangement 50 for providing topological map information according to the present invention. Most of the parts that are similar to parts of FIG. 4A are not further discussed. As in FIG. 4A the present embodiment the means 53 for identifying links and spreading link information comprises means for obtaining information about a first link, a first end of which being connected to the domain in which the arrangement 50 is located. In the present embodiment the means for obtaining information about a first link, however, comprises a receiver 67 arranged for receiving the information about the first link over a control connection 68. The actual means gathering necessary information is thereby provided elsewhere.

Furthermore, the present embodiment does not comprise the actual means for creating a system link map based on the compiled and stored link information, however, the map creator connection 57 leads to control connections within the domain. The means for creating a system link map may thereby be located anywhere.

Figure 5:
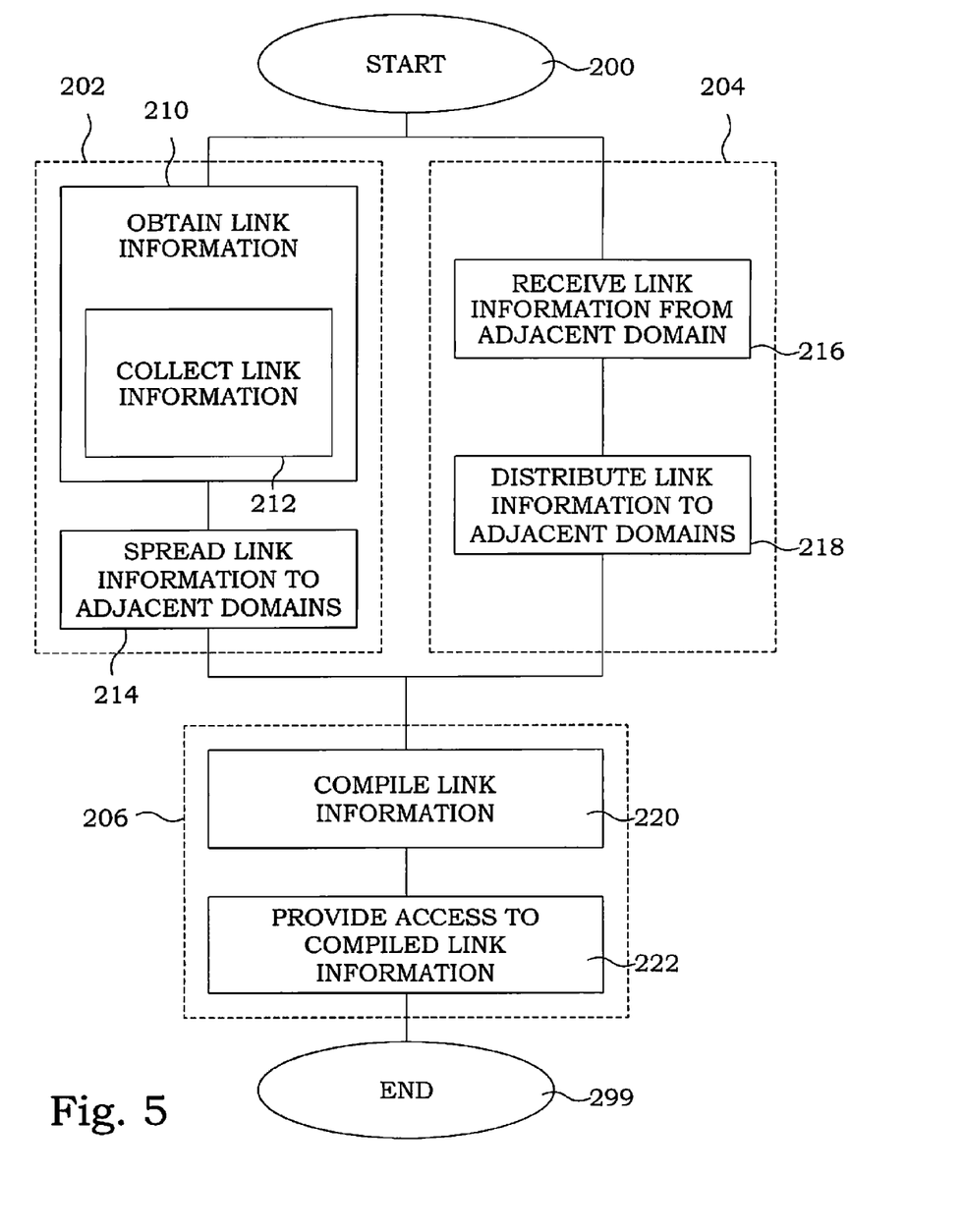
FIG. 5 is a flow diagram of main steps of an embodiment of a method according to the present invention.

FIG. 5 is a flow diagram of main steps of an embodiment of a method according to the present invention. The procedure starts in step 200. Two separate flow paths are present. A first flow path 202 involves steps providing identifying and spreading functionality. A second flow path 204 involves steps providing a forwarding functionality. Both these flow paths should be possible to follow, but may not necessarily be performed simultaneously. The first flow path 202 according to the present invention comprises a step 210, in which information about a first link connected to a first domain is obtained in the first domain. Such link information comprises according to the present invention a domain identity of the first domain, a link end identifier for a first end of the link, a domain identity of a second domain to which a second end of the link is connected and a link end identifier for said second end of said first link. Preferably, step 210 comprises a step 212 of actually collecting such information. However, in alternative embodiments, other procedures can be utilized to collect the information and the obtaining action is then reduced to receiving such link information. In step 214, the link information obtained in step 210 is spread to an adjacent domain to said first domain The second flow path 204 comprises a step 216, in which link information of the same type as is obtained in step 210 instead is received from an adjacent domain. In step 218, the received link information is distributed to a further adjacent domain, preferably according to certain loop stop-rules.

In a third part 206 of the procedure, the link information obtain or received in the flow paths 202 and 204, respectively, is collected and made available for mapping purposes. In step 220, available link information is compiled in the domain in question and in step 222, access to the compiled link information is provided for creation of a system link map. The procedure ends in step 299.

The initiation of the second flow path 204 is naturally trigged by adjacent domains by the reception of the link information. The timing of the second flow path 204 can be configured in different ways. The step 210 can be performed if/when a change of a link connected to the domain occurs. Furthermore, the step of collecting link information may also comprise further steps, e.g. involving processes of investigating the occurrence of any new adjacent domain. If the new adjacent domain already previously was present in the multi-domain communications system, but not connected directly to the domain in question, a new link can be reported, as e.g. in the examples of FIGS. 2A and 2B. However, if the new adjacent domain also is a new domain for the entire multi-domain communications system, further actions may have to be taken. Besides the spreading of the new link information, previously compiled link information has to be provided to the new adjacent domain. In other words, all available link information is preferably sent from the domain in question to the new adjacent domain.

The step of obtaining link information may also be performed on a regular basis. The multi-domain communications system may have agreed upon an update time period for link information. At regular intervals, each domain then investigates its available links and reports any deviations from earlier report to adjacent domains. Another approach is to spread link information about all available links on a regular basis, independent on whether the link information has been reported earlier or not. In such a case, the entire compiled link information is assured to be younger than a certain age.

The step of obtaining link information may also be performed on demand of any of the domains.

According to the present invention, there is typically no central system node level that is part of the map information collection process, i.e. the invention is not dependent on a hierarchically superior node. The participating domains interact as equal parties, thereby creating a flat top level of the system. However, since the actual topology of the inner part of the different domains is not of crucial importance for the present invention to be enabled, the intra-domain topology may differ from one domain to the other. More particularly, each domain may internally be organized in e.g. a hierarchical manner. This would e.g. be the case in the structure illustrated in FIG. 3D.

Figure 6:
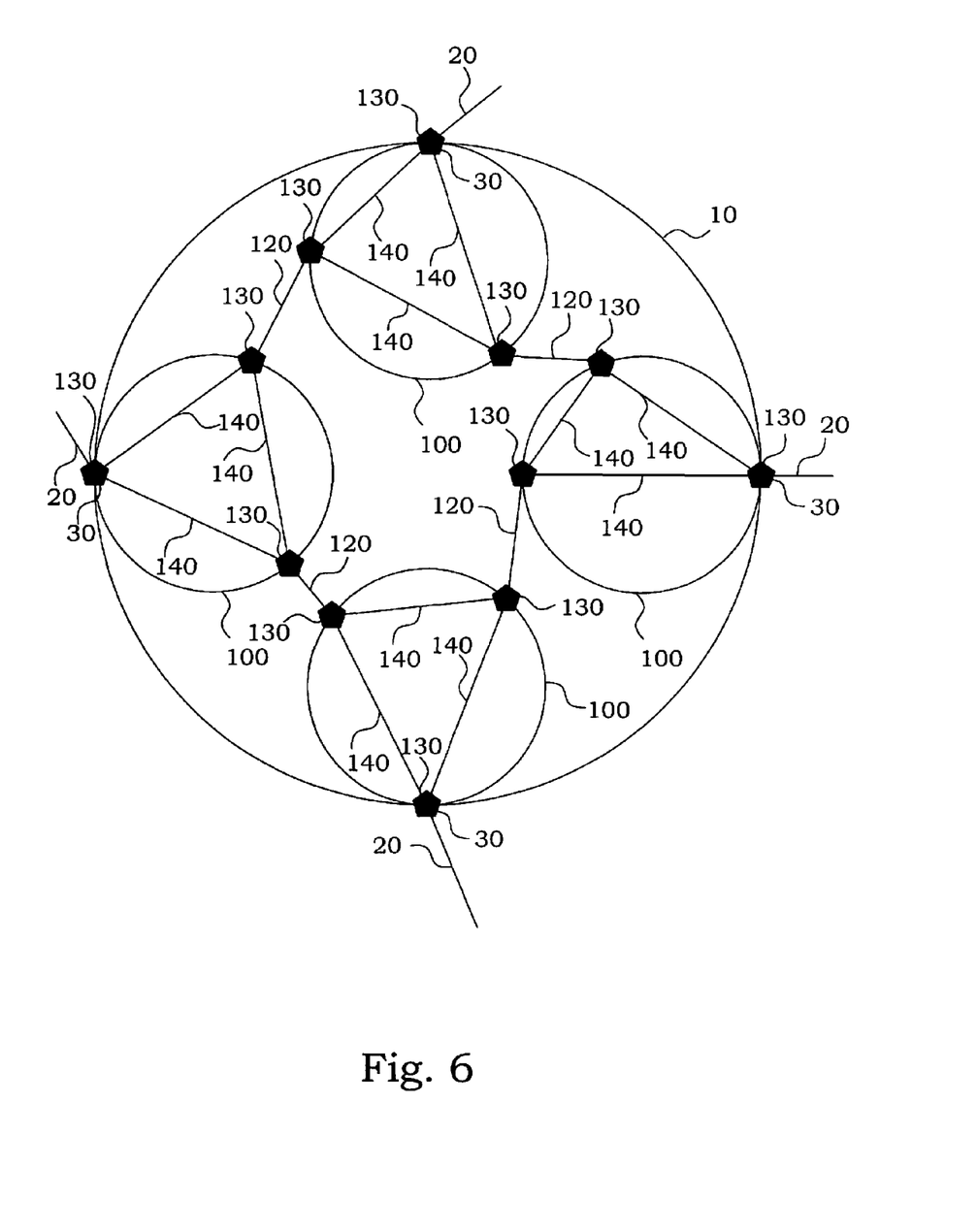
FIG. 6 is a block diagram schematically illustrating an embodiment of a domain configuration.

FIG. 6 illustrates a domain 10 that in turn comprises a group of sub-domains 100. In this embodiment, a border node of the domain 10 also acts as a sub-border node 130 of a sub-domain 100. Additionally, there are sub-border nodes 130 to sub-domains internally in the domain 10. The sub-border nodes 130 are connected by logical or physical intra-sub-domain links 140. Such a domain 10 may therefore be managed in the same manner as the earlier described multi-domain communications system 1. Anyone skilled in the art realizes that such finer division can be applied in several layers. One should, however, be aware of that a domain 10 according to FIG. 6 can operate together with hierarchically configured domains or domains comprising a single network in a multi-domain communications system according to the present invention.

According to description above, link information about all parts of a multi-domain communications system is collected and preferably compiled and stored in each domain. Based on the information that is available in each domain, a system link map may be created. The node actually performing the mapping (and maybe also the compiling and storing processes) may be located anywhere, as long as that node has access to the link information. The means for creating a system link map based on the compiled link information can also be configured in different ways, some of which are known by anyone skilled in the art. The maps provided by such map creator node may cover a part of the multi-domain communications system or the entire multi-domain communications system, depending on the needs. For many applications, a local map may be sufficient, whereas in other cases an entire system map is necessary.

The map can be used in many different applications. One already mentioned is in the context of providing VPNs over the domain borders. Another example is general inter-domain routing in a multi-domain system.

In the above description, the communication has been described in a relatively general manner. Different links, inter-domain or intra-domain, or other communication means providing e.g. control signaling may be performed by any suitable technology. Wired as well as wireless solutions in parts of or entire domains or in inter-domain communication are of course feasible.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for providing topological map information of a communications system having a plurality of domains, comprising the steps of:
   obtaining, in a first domain among the plurality of domains, information about a first link, a first end of which being connected to said first domain, wherein
   the first domain further comprises:
      a first border node including at least one port coupled to the first end of the first link,
      a second border node including at least one port coupled to the at least one port of the first border node via an intra-domain link, and
      a plurality of internal nodes, each internal node coupled to another internal node by at least one internal link,
   said step of obtaining comprises the step of collecting said information about said first link, and
   said step of collecting said information about said first link comprises the step of investigating occurrence of a new adjacent domain,
   sending, if an occurring new adjacent domain was not previously comprised in said multi-domain communications system, all available link information to said occurring new adjacent domain not previously comprised in said multi-domain communications system;
   spreading link information about said first link from said first domain to a domain adjacent to said first domain;
   said link information about said first link comprising:
      domain identity of said first domain;
      link end identifier for said first end of said first link;
      domain identity of a second domain to which a second end of said first link being connected; and
      link end identifier for said second end of said first link;
   receiving, in said first domain, link information about a second link from a domain adjacent to said first domain;
   distributing said link information about said second link to a domain adjacent to said first domain;
   compiling link information available in said first domain; and
   providing access to said compiled link information for creation of a system link map.

2. The method according to claim 1, wherein said link end identifier comprises at least one of
   a border node identity;
   an internal node identity;
   a port identity;
   an IP address; and
   a domain specific address.

3. The method according to claim 1, wherein said step of obtaining comprises the step of receiving said information about said first link.

4. The method according to claim 1, wherein both said link information about said first link and said link information about said second link comprise a time label representing the time of establishing the link information about said first link and said link information about said second link.

5. The method according to claim 1, wherein said step of distributing comprises loop stop functionality.

6. The method according to claim 1, wherein said second domain is different from said first domain, whereby said first link is an inter-domain link.

7. The method according to claim 1, wherein said second domain is the same as said first domain, whereby said first link is an intra-domain link.

8. The method according to claim 1, wherein said link information about said first link and said link information about said second link further comprise at least one of:
- transit policy;
- available bandwidth;
- transmission direction;
- link characteristics;
- wireless/wireline character; and
- information about addition, change or removal of link.

9. The method according to claim 1, wherein said step of providing access to said compiled link information comprises the step of storing said compiled link information in a database accessible for creation of a system link map of at least a part of said multi-domain communications system.

10. The method for creating a system link map of a communications system having a plurality of domains, comprising the steps of:
- providing topological map information according to claim 1; and
- creating a system link map based on said compiled link information.

11. An arrangement in a first domain of a communications system having a plurality of domains, comprising:
- means for obtaining information about a first link, a first end of which being connected to said first domain, wherein
- the first domain further comprises
  - a first border node including at least one port coupled to the first end of the first link,
  - a second border node including at least one port coupled to the at least one port of the first border node via an intra-domain link, and
  - a plurality of internal nodes, each internal node coupled to another internal node by at least one internal link,
- said means for obtaining information about said first link comprises means for collecting said information about said link,
- said means for collecting said information about said first link comprises means for investigating occurrence of a new adjacent domain, and
- means for sending all available link information to said occurring new adjacent domain, said means for sending being arranged to operate if an occurring new adjacent domain was not previously comprised in said multi-domain communications system;
- transmitter, arranged for spreading link information about said first link from said first domain to a domain adjacent to said first domain;
- said link information about said first link comprising:
  - domain identity of said first domain;
  - link end identifier for said first end of said first link;
  - domain identity of a second domain to which a second end of said first link being connected; and
  - link end identifier for said second end of said first link;
- receiver, arranged for receiving link information about a second link from a domain adjacent to said first domain;
- distributor, arranged for distributing said link information about said second link to a domain adjacent to said first domain;
- compiler of link information available in said first domain; and
- means for providing access to said compiled link information for creation of a system link map.

12. The arrangement according to claim 11, wherein said link end identifier comprises at least one of:
- a border node identity;
- an internal node identity;
- a port identity;
- an IP address; and
- a domain specific address.

13. The arrangement according to claim 11, wherein said means for obtaining information about said first link comprises receiver arranged for receiving said information about said first link.

14. The arrangement according to claim 11, wherein said link information comprises a time label representing the time of establishing the link information.

15. The arrangement according to claim 11, comprising loop stop functionality.

16. The arrangement according to claim 11, wherein said second domain is different from said first domain, whereby said first link is an inter-domain link.

17. The arrangement according to claim 11, wherein said second domain is the same as said first domain, whereby said first link is an intra-domain link.

18. The arrangement according to claim 11, wherein said link information further comprises at least one of:
- transit policy;
- available bandwidth;
- transmission direction;
- link characteristics;
- wireless/wireline character; and
- information about addition, change or removal of link.

19. The arrangement according to claim 11, wherein means for providing access to said compiled link information comprises a database of said compiled link information accessible for creation of a system link map of at least a part of said multi-domain communications system.

20. The arrangement for creating a system ink map of a communications system having a plurality of domains, comprising:
- arrangement according to claim 11; and
- means for creating a system link map based on said compiled link information.

21. A node in a first domain of a communications system having a plurality of domains, comprising an arrangement according to claim 11.

* * * * *